United States Patent [19]

Copeland

[11] 4,064,811

[45] Dec. 27, 1977

[54] QUICK DISCONNECT ANCHOR

[76] Inventor: Donald R. Copeland, 11718 E. 1st St., Tulsa, Okla. 74128

[21] Appl. No.: 642,918

[22] Filed: Dec. 22, 1975

[51] Int. Cl.² .................. A44B 19/00; B25B 25/00; B60P 7/06; B61D 45/00
[52] U.S. Cl. .................. 105/476; 24/224; 43/21.2; 105/485; 224/42.45 R; 248/538; 248/539; 248/222.3
[58] Field of Search .............. 224/5 E, 29 R, 42.03 R, 224/42.1 D, 42.1 E, 42.45 R, 42.46 R; 105/475, 476, 477, 478, 479, 480, 481, 482, 483, 484, 489; 248/73, 223, 224, 225, 226 R, 500, 503, 518, 534, 538, 539, 540; 24/223, 224; 43/21.2

[56] References Cited

U.S. PATENT DOCUMENTS

| | | | |
|---|---|---|---|
| 2,422,693 | 6/1947 | McArthur | 24/233 |
| 2,688,504 | 9/1954 | Parker | 105/482 |
| 2,835,066 | 5/1958 | Spilker | 43/21.2 |
| 2,876,729 | 3/1959 | Georgette | 248/503 |
| 2,891,490 | 6/1959 | Elsner | 105/482 |
| 3,564,753 | 2/1971 | Fravel | 248/518 X |
| 3,698,677 | 10/1972 | Looker | 105/482 |
| 3,709,156 | 1/1973 | Bowers | 105/484 |
| 3,802,652 | 4/1974 | Holton, Jr. | 248/534 |
| 3,841,660 | 10/1974 | Clark | 248/226 R |
| 4,020,770 | 5/1977 | McLennan et al. | 105/479 X |

*Primary Examiner*—Robert J. Spar
*Assistant Examiner*—Howard Beltran
*Attorney, Agent, or Firm*—Head, Johnson & Chafin

[57] ABSTRACT

An attachment apparatus designed to facilitate the quick connection and release of movable objects relative to a fixed surface. The apparatus provides a fixed base shoe member which is firmly secured to a stationary surface. The shoe member is constructed from a spherical segment having a channeled groove extending therethrough, inwardly extending flanges are provided in conjunction with the channel groove for holding a movable foot member within the groove. The foot member is secured to a coupling apparatus which carries a retainer means for locking the foot member in place directly beneath the inwardly extending flanges of the shoe member.

9 Claims, 13 Drawing Figures

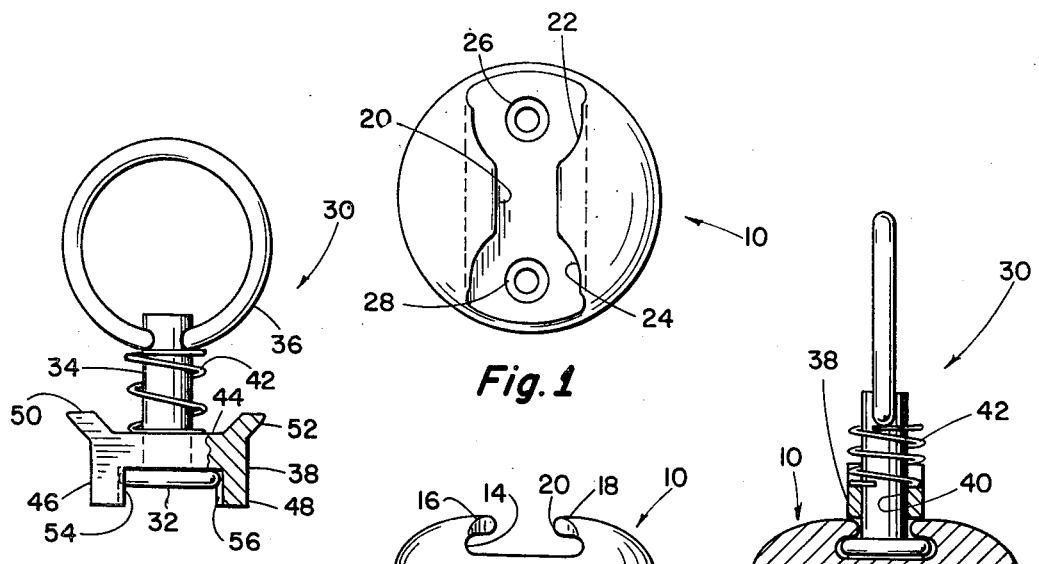
Fig. 1
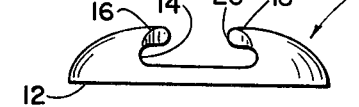
Fig. 2
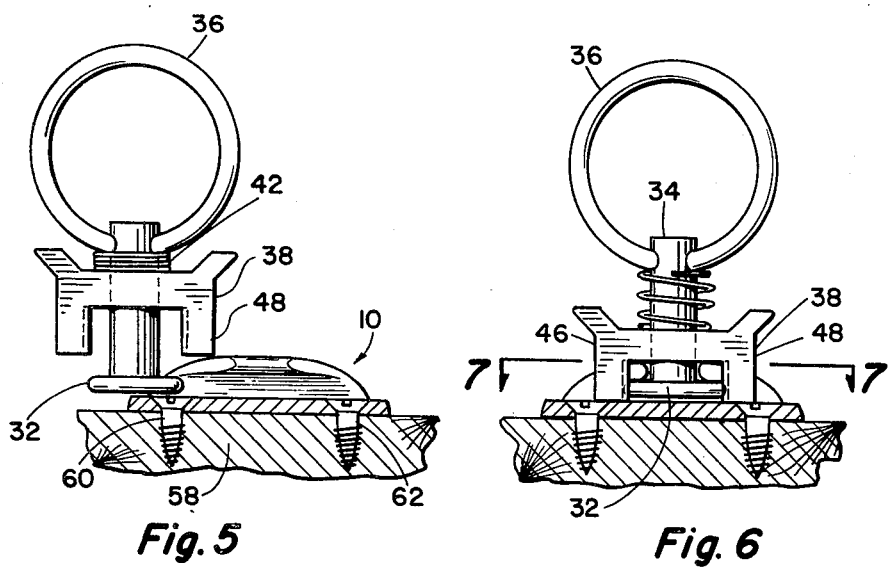
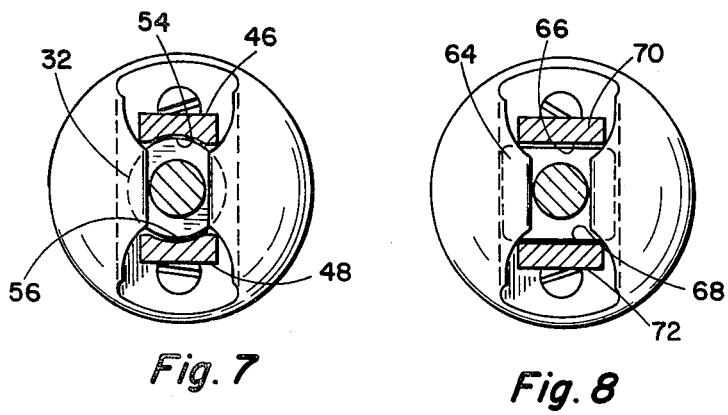

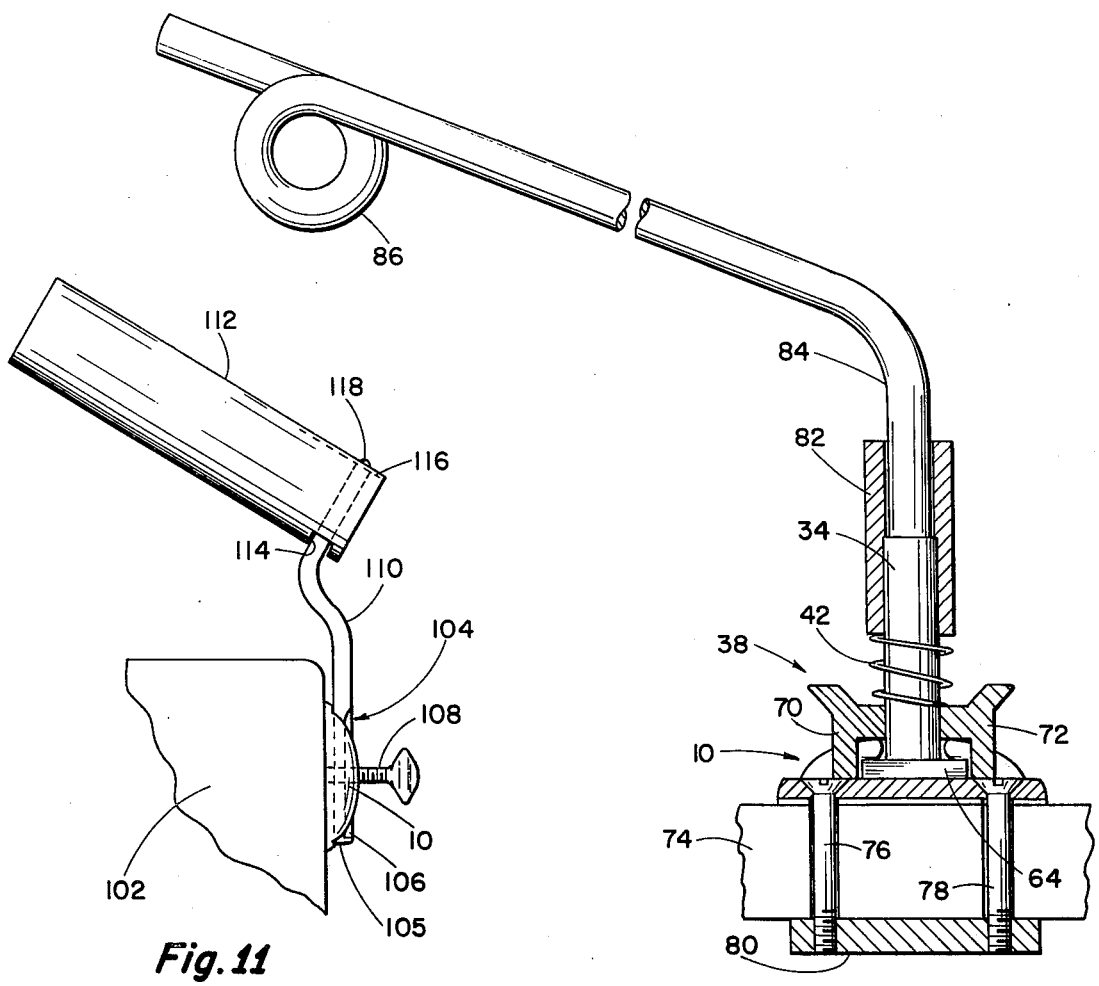
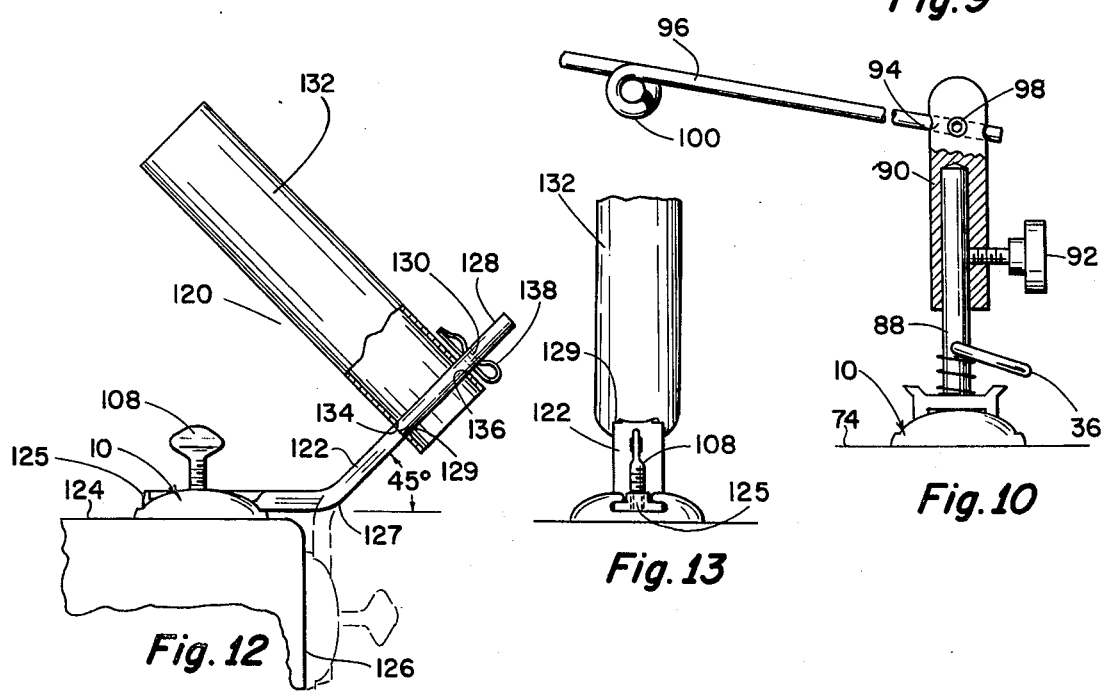

1

QUICK DISCONNECT ANCHOR

BACKGROUND OF THE INVENTION

1. Field of the Invention

The present invention relates to an attachment apparatus and more particularly but not by way of limitation to an apparatus particularly useful in the boating and fishing field. The invention further relates to a single quick release tie-down point utilizing a spherical segment shaped shoe member with cooperating pin and locking foot member for securing an ordinarily movable object to the shoe member.

2. Description of the Prior Art

Heretofore, there has been much activity in the field of cargo tie-down apparatuses and particularly those that take the form of a rail type tie-down assembly such as described in the patent to Parker U.S. Pat. No. 2,688,504 issued in 1954 for a "Cargo Tie-Down Assembly". However, as with the bulk of this art, the tie-down apparatuses are of a special purpose and includes an elongated rail base member which is provided with a channeled groove for slidably receiving a foot member therein in order to place a tie-down ring which is attached to the foot member at any preselected point along the rail.

However, since most of the activity in this field is directed toward commercial tie-down apparatuses there has been very little effort in providing the weekend boatsman or fisherman with such tie-down facilities tailored to their specific use. On most small boats and the like, it is pretty well established where certain tie-down points are desirable, therefore obviating the need for a complete tie-down rail.

Further, since the weekend boatsman or fisherman will be moving around over his boat it is desirable to provide a tie-down mechanism which, when not in use, provides a surface which is not likely to damage clothing, fishing equipment, or the like.

There has been a long felt need for a tie-down apparatus for small boat sporting uses which is relatively inexpensive yet easy to operate and of durable construction.

SUMMARY OF THE INVENTION

The present invention relates to a tie-down attachment apparatus which, although useful for many household and commercial purposes, is particularly designed and constructed for use by the weekend boater, fisherman and water skier.

The apparatus comprises a shoe member which is in the shape of a spherical segment having a flat base portion which is attachable to a fixed surface such as a boat gunnel, building or the like. The rounded or spherical surface presents no sharp protrusions for snagging clothing or fishing lines when the attachment member is not in use.

The shoe member is provided with a channeled groove therethrough which is parallel to the flat base portion. The outer walls of the groove are provided with inwardly extending flanges having enlarged openings in the flanges at each end of the channeled groove. The inwardly extending flanges are formed as an integral part of the shoe member and form the outer surface of the spherical segment.

The shoe member is particularly adaptable for use with an elongated bar or tongue attachment apparatus having a cross-sectional shape compatible with the cross-sectional shape of the groove and inwardly extending flanges. This type attachment device can be simply locked within the base member by means of an ordinary set screw extending through the tongue member and engaging the lower surface of the groove.

Another, and more versatile attachment comprises an elongated pin having a foot member or disk attached to one end thereof. The disk is suitable for sliding through the channeled groove while the pin member is of a dimension to pass between the inwardly extending flanges of the shoe member.

The outer end of the pin member may be provided with any suitable coupling apparatus such as a tie-down ring or other suitable bracket for holding equipment and the like. A retaining means is carried by the pin member and comprises a cross bar and parallel leg members forming a substantial U-shaped bracket. A cross member is provided with a bore therethrough and slidably disposed on the pin member with the leg members directed toward the foot member at the end of the pin. A helical spring is provided between the bracket and the coupling means for urging the bracket toward the foot member at the end of the pin. The length of the leg members of the bracket are such that when the cross member is resting directly on top of the inwardly extending flanges, the said foot members will engage the surface of the channeled groove.

The curved outer surface of the shoe member serves a separate function in use by guiding the bracket member up and over the flange members when the foot member is being pushed within the channeled groove toward a central position. This curved surface therefore helps guide the leg members of the bracket into position for ease of connection of the apparatus.

The disk member may be of any suitable cross-sectional shape such as circular when it is desirable for the attachment pin or tie-down ring or the like to rotate with respect to the shoe member. If on the other hand, this rotation is undesirable the foot member may be rectangularly shaped to prevent rotation within the channeled groove.

It is another feature of an invention that the inwardly facing surfaces of the leg members of the bracket be provided with a cross-sectional shape conforming to the shape of the foot member disc. This permits the leg members to be closer to the supporting pin member which increases the strength of the unit while also providing for more stability since there is less chance that the pin member for the associated bracket may be tilted up thereby disloding the leg member from the groove.

DESCRIPTION OF THE DRAWINGS

Other and further advantageous features of the present invention will hereinafter more fully appear in connection with a detailed description of the drawings in which:

FIG. 1. is a plan view of the shoe member of the present invention.

FIG. 2 is an end elevational view of the shoe member of FIG. 1.

FIG. 3 is a side elevational view partially in section of a coupling device for use with the shoe member.

FIG. 4 is a partial sectional elevational view of the attachment apparatus of FIG. 3 engaged with the shoe apparatus of FIGS. 1 and 2.

FIG. 5 is a side elevational view partially in section with attachment apparatus being connected to the shoe member.

FIG. 6 is a view similar to FIG. 5 with the attachment apparatus locked in place within the shoe member.

FIG. 7 is a sectional view of the apparatus in FIG. 6 taken along the broken lines 7—7 of FIG. 6.

FIG. 8 is a sectional plan view similar to FIG. 7 but showing a nonrotatable foot member engaged in the shoe member.

FIG. 9 is a sectional elevational view of the attachment apparatus embodying the present invention and having lantern hanger means attached thereto.

FIG. 10 is a modification of the hanger apparatus shown in FIG. 9.

FIG. 11 is a side elevational view of a fishing rod holder being connected to the shoe member of FIGS. 1 and 2.

FIG. 12 is a fishing rod holder similar to that of FIG. 11 for horizontal or vertical mounting.

FIG. 13 is an end elevational view of the fishing rod holder of FIG. 12.

DESCRIPTION OF THE PREFERRED EMBODIMENT

Referring to FIGS. 1 and 2, reference character 10 generally indicates a shoe member formed of a single piece of metal or other suitable material and which is provided with a spherical segment shape having a flat base surface 12. The shoe member is provided with a flat channeled groove 14 extending transversely therethrough parallel to the flat base member 12. The walls of the channeled groove 14 are provided with inwardly extending flange members 16 and 18 which are made as an integral part thereof. These flange members provide a slot opening 20 therebetween. The opening 20 is enlarged at each end of the groove 14 shown at reference characters 22 and 24. The enlarged openings 22 and 24 are somewhat circular in shape and mesh at the outer edges thereof into the same width as the channeled groove therethrough. The shoe member is provided with a pair of spaced countersink bores 26 and 28 located in the channeled groove and extending through the base surface 12 thereof for attachment of the shoe member to substantially any solid surface.

Referring now to FIG. 3, reference character 30 generally indicates a coupling means comprising a foot member or disc 32 which is slidable within the groove 14 and is wider than the narrow slot 20 between flanges 16 and 18. An elongated pin member 34 is attached at one end thereof to one surface with a disc 32, the pin 34 having a diameter less than the width of the narrow slot 20 of the shoe member. The outer end of pin 34 is provided with a tie-down ring 36 secured thereto in any well known manner.

The coupling means 30 also comprises a retainer bracket for locking the foot member 32 in place within the slot 14 of the shoe member. The retainer means comprises a bracket 38 having a bore 40 therethrough and being slidably disposed on the pin 34. The retainer means also comprises a helical compression spring 42 disposed between the bracket 38 and the tie-down ring 36 for urging the said bracket 38 toward the foot member 32.

The bracket 38 is made up of a cross member 44 which is slidably carried on pin 34 and a pair of parallel leg members 46 and 48 which form a substantially U-shaped bracket. A pair of outwardly extending ear members 50 and 52 are attached to the cross member 44 to facilitate lifting of the bracket 38 against the pressure of the spring 42. The inner surfaces 54 and 56 of the leg members 46 and 48 respectively are shaped to conform to the outer periphery of the disc member 32. The leg members 46 and 48 of the bracket 38 are spaced far enough apart to straddle the inwardly extending flange members 16 and 18 of the shoe member 10.

Referring now to FIG. 5, the shoe member 10 is shown in cross-section with the foot member 32 being moved to the right as being viewed in FIG. 5 into the channel groove 14. The bracket 38 has been lifted against the pressure of the spring 42 in order to allow the leg member 48 thereof to pass over the inwardly extending flanges 16 and 18. It is noted as shown in FIG. 5 that the leg member 48 intersects the curved surfaces making up the spherical segment and that simple pressure to the right as shown in FIG. 5 will cause the bracket to ride up over that surface over the flanges and into place on the opposite enlarged opening. The curved surface therefore tends to facilitate the snapping of the bracket into place as shown in FIG. 6.

It is seen in FIG. 6 that the disc member 32 is locked into place within the groove 14 by means of the spring loaded bracket 38 having leg members 46 and 48 which straddle the inwardly extending flange members 16 and 18.

FIG. 4 shows an end view of the coupling means 30 locked into the shoe member 10; the shoe member 10 and the bracket 38 being shown in section.

It is noted also in FIGS. 5 and 6 that the shoe member 10 is secured to an object 58 by means of countersink screws 60 and 62 utilized in conjunction with the bores 26 and 28 hereinbefore described.

Referring now to the FIG. 7 plan view which shows the disc 32 being round in shape with the inwardly facing surfaces 54 and 56 of the leg members 46 and 48 being grooved to conform to the circular shape with the disc 32. It is seen that this permits the leg members 46 and 48 to be constructed of a lesser width thereby allowing them to be placed closer to the upper most point of the flange members 16 and 18. Stated another way, if in a case of a circular disc, the inner surfaces of the leg members were flat, it would be necessary that the leg members be widened thereby contacting the flange surfaces in the enlargement area farther away from the center and hence farther down on the surface of the spherical segment shoe member.

FIG. 8 depicts a plan view of a second embodiment of the shoe member as shown in FIG. 7 but wherein a disc member 64 of rectangular shape is slidably disposed within the slot 14. The diagonal dimension of the disc 64 is greater than the width of the channel groove 14 thereby preventing the disc 64 from rotating within the groove. It is also noted that the inside surfaces 66 and 68 of leg members 70 and 72 repectively are shaped flat to conform to the edge surface of the disc 64.

It should be pointed out that the embodiment having tie-down rings 36 are useful for many purposes around the home as well as tie lines on a boat, or boat dock itself. Experiment has shown that they are substantially strong and also useful as quick disconnect ski attachments on the stern of a boat for water skiing purposes.

By using a circular disc as shown at 32, the ring member may freely rotate which will tend to decrease the possibility of tangled lines due to twisting thereof. On the other hand, the configuration as shown in FIG. 8 should be used for cases wherein it is undesirable to allow the pin member 34 to rotate about its own axis when locked in position with respect to the shoe member 10.

Referring now to FIG. 9, a shoe member 10 is depicted as being attached to a plastic or fiberglass structure 74 by means of elongated countersink bolts 76 and 78 which extend through the body 74 and screw into a nut plate 80 which is oppositely diposed from the shoe member 10. The bracket 38 having leg members 70 and 72 and a rectangular disc member 64 as shown in FIG. 8 make up the coupling means. Instead of being provided with a tie-down ring as shown in 36, a sleeve member 82 is firmly secured to the upper end of the pin member 34 with the outer end of the sleeve member 82 extending upwardly to receive one end of a hanger rod 84 therein. The hanger rod 84 has at the opposite end thereof a 360° bend therein thereby forming an eyelet 86 which is suitable for holding lanterns and the like outwardly beyond the side of a boat. Naturally the apparatus can be used in substantially any position where there is a foot member 10 secured in place. The spring member 42 is disposed on the pin 34 between the sleeve member 82 and the bracket 38 to urge the bracket 38 toward the foot member 64. The rod 84 and pin member 34 may be fixed within the sleeve member 82 in any well known manner such as by liquid soldering or adhesive techniques.

Referring now to FIG. 10, a base shoe member 10 is secure to a surface such as the material 74 similar to that hereinbefore described. In this case, a tie-down ring 36 is secured to an elongated pin 88, the uppermost portion of the pin 88 being slidably disposed within a closed-end sleeve member 90. The sleeve member 90 is locked into place on the upper end of the pin 88 by means of a set screw with operator knob 92. The upper end of the sleeve member 90 is provided with a transverse bore 94 therethrough for slidably receiving one end of a rod 96 therein. The rod 96 is held in place within a bore 94 by means of a set screw 98. The outer end of the rod 96 is provided with a 360° bend thereby forming an eyelet 100 similar to the eyelet 86 hereinbefore described. The apparatus shown in FIG. 10 is simply a modification or variation of the apparatus shown in FIG. 9.

Referring now to FIG. 11, a base member 10 is secured to the side of relatively fixed object 102 which could be the side of a boat, building or the like. The coupling means in this case comprises an elongated tongue member 104 which is provided with a substantially cross-sectional T-shape, the cross member thereof riding within the channel groove 14 of the shoe member 10 with the leg member 106 of the T-shaped member extending upwardly between the flanges 16 and 18 of the shoe member 10. The tongue member 104 is locked in place within the shoe member 10 by means of a set screw 108.

A curved bar 110 is secured to one end of the tongue member 104. A fishing rod holder 112 which comprises a sleeve member is provided with a rectangular slot 114 adjacent one end thereof for receiving the outer end 116 of the curved bar 110 therethrough. The outer extremity 116 of the bar 110 is secured to the opposite side of the tube member 112 by means of a screw or blind rivot 118.

FIGS. 12 and 13 depict a fishing rod holder 120 which is similar to that hereinbefore described in connection with FIG. 11 but having a bar 122 which is suitable for attaching the apparatus to a shoe member 10 mounted on a horizontal surface 124 or a vertical surface 126.

From the foregoing, it is apparent that the present invention provides a quick-disconnect attachment apparatus which, although being suitable for many domestic commercial uses is particularly designed and constructed for use by the recreational boater for fishing, water skiing and other various uses.

Whereas, the present invention has been described in particular relation to the drawings attached hereto, other and further modifications apart from those shown or suggested herein may be made within the spirit and scope of the invention. One end of the bar 122 is a T-shaped tongue member 125 similar to that of FIG. 11. The mid-portion of the bar is provided with a 45° bend 127. The opposite end 128 of the bar 122 is reduced is size forming a shoulder 129. The bar end 128 is provided with a bore 130 spaced from the shoulder 129. A tube fishing rod holder 132 has a pair of assigned slots 134 and 136 for receiving the reduced end 128 of the bar 122. The holder 122 is held in place against the shoulder 129 by snap-lock pin 138. Vertical surface mounting is accomplished by reversing the holder 132 as shown by the phantom lines shown in FIG. 12.

What is claimed:

1. Quick disconnect device for attachment of objects to a fixed surface relative thereto comprising a spherical segment shoe member having a flat base surface securable to the fixed surface, a channel groove transversely extending completely through the segment parallel to the base surface and having the opposite ends open, inwardly extending flange members making up a portion the outer surface of the spherical segment and forming a narrow slot between said flanges, enlarged openings in the flanges at each end of the channel groove in communication with the respective open ends thereof; a coupling means attachable to the spherical segment and comprising a foot member slidable through said open ends into the channel groove, attachment means secured to the foot member for the attachment of movable objects, retainer means carried by the attachment means and engageable with the shoe member to selectively lock the foot member within the channel groove.

2. A quick disconnect device as set forth in claim 1 wherein the foot member comprises an elongated flat bar slidable within the channel groove and being wider than the narrow slot between the flanges of the shoe member, and wherein the attachment means comprises an elongated narrow bar secured to one surface of the flat bar and extendable between the flanges when the foot member is disposed within the channel groove, and wherein the retainer means comprises a threaded bore through the narrow bar and flat bar and a set screw rotatable therein and engageable with the shoe member.

3. A quick disconnect device as set forth in claim 2 wherein the attachment means narrow bar and the foot member flat bar are of integral construction forming a substantial T-shape cross-section and the outer portion thereof extends beyond the shoe member.

4. A quick disconnect device as set forth in claim 3 wherein a fishing rod holder comprising a tube having transverse slot adjacent one end thereof for receiving the outer portion of the attachment means therethrough, the end of the attachment means being attached to the other inside surface of the tube opposite the slot.

5. A quick disconnect device as set forth in claim 4 wherein said outer portion of the attachment means is a bar having a 45° bend, a shoulder means spaced from the end thereof, a fishing rod holder comprising an elongated tube member having a pair of aligned slots for receiving the outer portion end of the attachment means therethrough one slot being engageable with the shoulder.

6. A quick disconnect device as set forth in claim 1 wherein the foot member comprises a flat plate slidable within the channel groove and having width greater than the narrow slot between the flanges, the attachment means comprising an elongated pin secured at one end to one surface of the plate, the pin diameter being less than the width of the narrow slot and extending outward therethrough when the plate is centered within the channel groove, coupling device secured to the outer portion of the pin for attachment to movable objects, and wherein the retainer means comprises a bracket which in turn comprises a cross member and parallel leg members at opposite ends thereof which form a U-shaped cross-section, the cross member being slidably disposed on the pin, the leg members being directed toward the plate end of the pin, the inside surfaces of the leg members having cross-sectional shape to conform to the shape of the edge of the plate for receiving said plate therebetween, the leg members being insertable into the opposite enlarged openings in the flanges and engageable with the shoe member groove, and a helical compression spring surrounding the pin between the bracket and the coupling device for urging the bracket toward the plate foot member.

7. A quick disconnect device as set forth in claim 6 wherein the foot member plate is round in shape and rotatable within the channel groove and the coupling device is a tie-down ring pivotally secured to the outer end of the attachment pin.

8. A quick disconnect device as set forth in claim 6 wherein the foot member plate is rectangular in shape, the diagonal dimension being greater than the width of the channel groove.

9. A quick disconnect device as set forth in claim 8 wherein the coupling device comprises a sleeve member fixed to the outer end of the pin, an elongated rod being attached to the outer end of the sleeve member said longitudinal rod having a 360° loop therein to form a support eyelet.

* * * * *